Aug. 9, 1960 H. J. COVENTRY 2,948,328
APPARATUS FOR CUTTING TACKY MATERIAL
Filed Nov. 7, 1957 4 Sheets-Sheet 1

INVENTOR.
H. J. COVENTRY
BY A.C. Schwarz, Jr.
ATTORNEY

United States Patent Office 2,948,328
Patented Aug. 9, 1960

2,948,328

APPARATUS FOR CUTTING TACKY MATERIAL

Henry J. Coventry, Baltimore, Md., assignor, by mesne assignments, to Western Electric Company, Incorporated, New York, N.Y., a corporation of New York Filed Nov. 7, 1957, Ser. No. 695,088

9 Claims. (Cl. 154—1)

This invention relates to apparatus for cutting tacky material, and more particularly to apparatus for cutting out a portion of tacky material from an advancing composite composed of a strip of tacky material adhering to the surface of a backing sheet of nontacky material.

In the splicing of communications cable, it is customary to provide a sealed housing for the spliced portion, which housings are constructed usually of two semicircular halves, which may be placed together around the spliced portion. Pieces of a tacky sealing compound are used to seal the housing and the spaces between the housing and the cable, to provide a completely sealed splice.

Suitable pieces of the tacky sealing compound are supplied customarily in a splicing package consisting of an elongated cord and two flat strips, each of the strips being approximately half the length of the cord. The two strips and the cord are wrapped in one sheet of wax paper, which paper is so folded as to prevent contact between the various tacky components in the package.

In order to mass produce such a splicing package, an advancing composite is formed, composed of the strip of tacky material spaced from the cord of the same material, both adhering to the upper surface of a backing sheet of wax paper. It is necessary, first, to provide an apparatus such as the one forming the subject matter of the invention, for cutting out a succession of portions from the strip of tacky material, the cord being bypassed, at predetermined intervals along the length of the advancing composite. This cutout composite is then severed to length, midway between successive cutout portions, by a second cutter. The paper is folded over this unit and the folded unit is packaged in a suitable manner.

An object, therefore, of the invention is to provide an improved apparatus for cutting tacky material.

A more specific object of the invention is to provide apparatus for cutting out a portion of tacky material from an advancing composite composed of a strip of tacky material adhering to the surface of a backing sheet of nontacky material.

In the cutting out of portions of tacky material from an advancing composite composed of a strip of tacky material adhering to the surface of a backing sheet of nontacky material, it is important that the apparatus cut completely through the tacky strip, but not contact the backing sheet.

Accordingly, it is a further object of the invention to provide a cutting apparatus whereby the cutting means may be moved into and out of engagement with the advancing composite so as to cut out completely a portion of the tacky strip without cutting the backing sheet.

A problem encountered in apparatus of this type is that of disposing of the cutout portions so that the cutter may operate continuously.

Therefore, it is still another object of the invention to provide a cutting apparatus so designed that the successive cutout portions will be retained within the cutter, each successive cutout portion adhering to and pushing the next preceeding section inwardly within the cutter to form a continuous strip of cutout portions.

Another difficulty encountered in apparatus of this type is that the remaining portions of the tacky strip adjacent to the cutter tend to stick to the outside of the cutter, and be withdrawn from the backing sheet as the cutter is moved out of cutting engagement with the tacky strip.

Accordingly, it is a further object of the invention to provide means for stripping the remaining portions of the tacky strip adjacent to the cutter away therefrom, and for pushing such remaining portions back into position on the backing sheet, upon movement of the cutter out of engagement with the tacky strip.

An apparatus for cutting out a portion of tacky material from an advancing composite composed of a strip of tacky material adhering to the surface of a backing sheet of nontacky material, embodying certain features of the invention, may include a hollow cutter and means for moving the cutter into and out of engagement with the advancing composite, so constructed and arranged that the cutter will cut out completely a portion of the tacky strip without cutting the backing sheet, the cutout portion being retained within the hollow cutter upon movement thereof out of engagement with the advancing composite. Means are provided for stripping the remaining portions of the tacky strip adjacent to the cutter away therefrom and for pushing such remaining portions back into position on the backing sheet substantially simulatneously with the movement of the cutter out of engagement with the advancing composite.

Other objects and advantages of the invention will appear from the following detailed description of a specific embodiment thereof, when read in conjunction with the appended drawings, in which:

Fig. 5 illustrates generally a modified form of the cutting apparatus.

Figure 1:
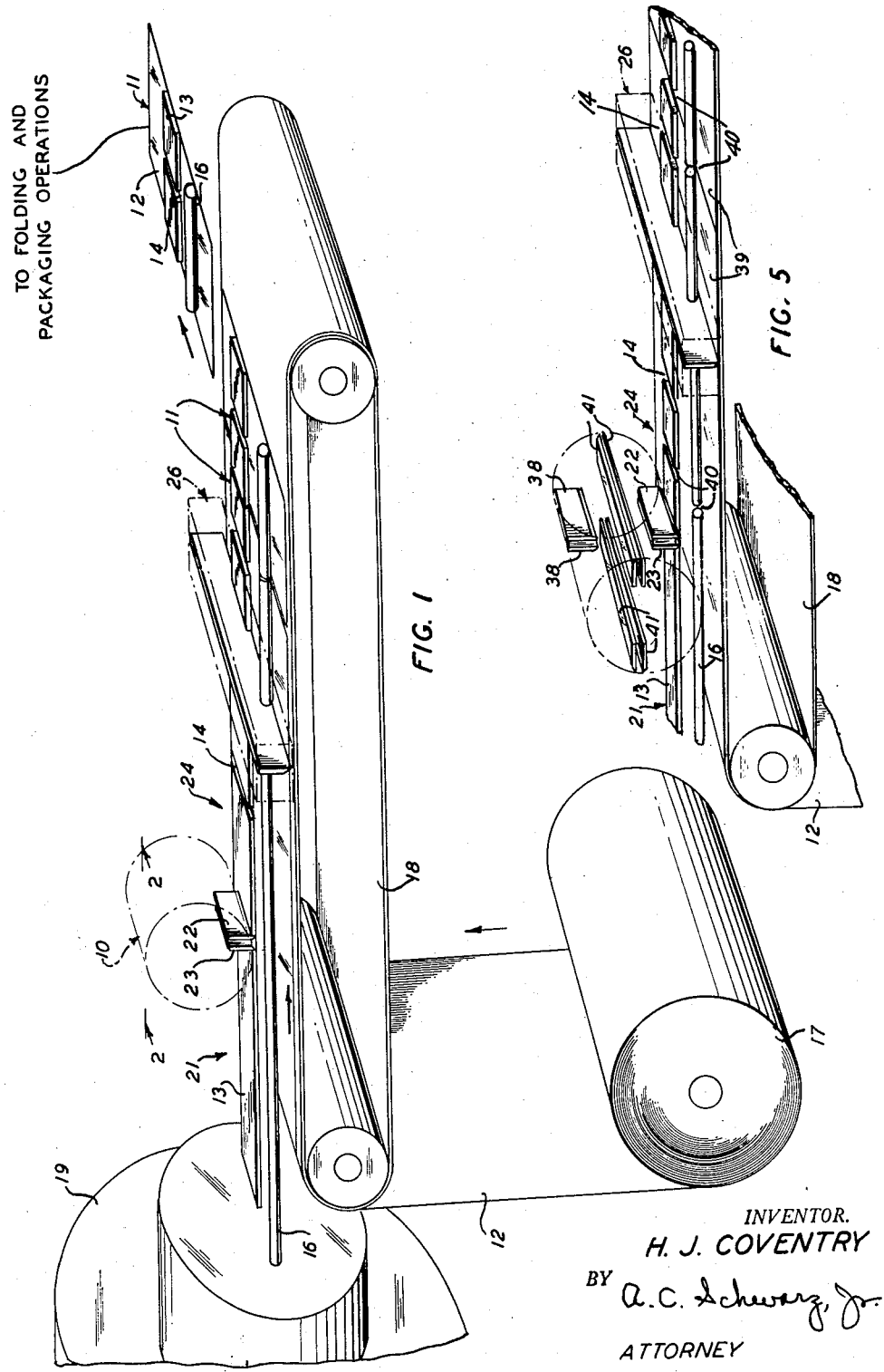
Fig. 1 is a diagrammatic view showing generally the improved cutting apparatus in conjunction with other apparatus with which it may be used.

Referring now in detail to the drawings, and in particular to Fig. 1, the improved cutting apparatus, designated generally by the numeral 10, is shown in conjunction with other apparatus with which it may be used. The entire apparatus shown in Fig. 1 operates to form a succession of composite units 11—11. Each of the composite units 11—11 is composed of a rectangular backing sheet 12 of nontacky material such as wax paper, having adhered to its upper surface a strip 13 of tacky material having a cutout portion 14, and a tacky cord 16 of the same material.

The tacky material may be an electrical sealing compound, suitable for use in the sealing of the protective housings used in the splicing of communications cable. Such a compound may be composed of butyl rubber, carbon black and a polyisobutylene plasticizer. This material is tacky as extruded and remains so, without curing, for a relatively long period of time.

In order to manufacture continuously a series of such composite units 11—11, a backing sheet 12 of wax paper is advanced continuously from a supply package 17 onto the surface of a conveyor belt 18 for movement therewith. An extruder 19 supplies a continuous strip 13 of the tacky material and a continuous cord 16 of the same material. The strip 13 and the cord 16 are guided, in spaced relationship to each other, onto the upper surface of the backing sheet 12 to which they adhere, forming an advancing composite 21. The rate of extrusion and the rate of paper supply are synchronized by suitable means (not shown) with the speed of the conveyor belt 18, so that the composite 21 advances at a uniform rate with the conveyor 18.

The advancing composite 21 travels through the cutting apparatus 10, and, when a preselected length of the composite 21 has passed therethrough, a suitable hollow cutter, shown as a pair of spaced cutting blades 22 and 23, operates in a manner to be described in detail hereinafter, to cut out the portion 14 from the tacky strip 13 without cutting the backing paper 12. As seen, the tacky cord 16 bypasses the cutting blades 22 and 23. Thus, an intermediate composite 24, having the portion 14 removed from the tacky strip 13, is advanced beyond the cutting apparatus 10.

The intermediate composite 24 is then advanced by the conveyor belt 18 to a second cutter 26, which is synchronized with the cutting apparatus 10 to sever completely the intermediate composite 24 at a point midway between successive cutout portions 14—14, thus forming a succession of the composite units 11—11.

These composite units 11—11 are advanced next to a folding station, whereat a portion of the sheet 12 of wax paper is folded over the strip 13, another portion of the sheet 12 is folded over the cord 16, and then the unit is folded again so that the paper enclosed strip 13 lies adjacent to the paper enclosed cord 16. The folded unit is then packaged by suitable means for eventual use in cable splicing.

While the improved cutting apparatus 10 has especial utility in the manufacture of this particular product, it is generally useful whenever it is desired to cut out a portion of tacky material from an advancing composite composed of a strip of tacky material adhering to the surface of a backing sheet of nontacky material.

In order to facilitate an understanding of the invention, the following detailed description of the cutting apparatus 10 will consider an advancing composite 21 composed only of a strip 13 of tacky material to be cut and a backing sheet 12. It will be understood that, when the advancing composite includes another element not to be cut, such as the cord 16 before-described, only the strip 13 to be cut passes beneath the cutting blades 22 and 23, the cord 16 being bypassed, as seen in Fig. 1.

Figure 2:
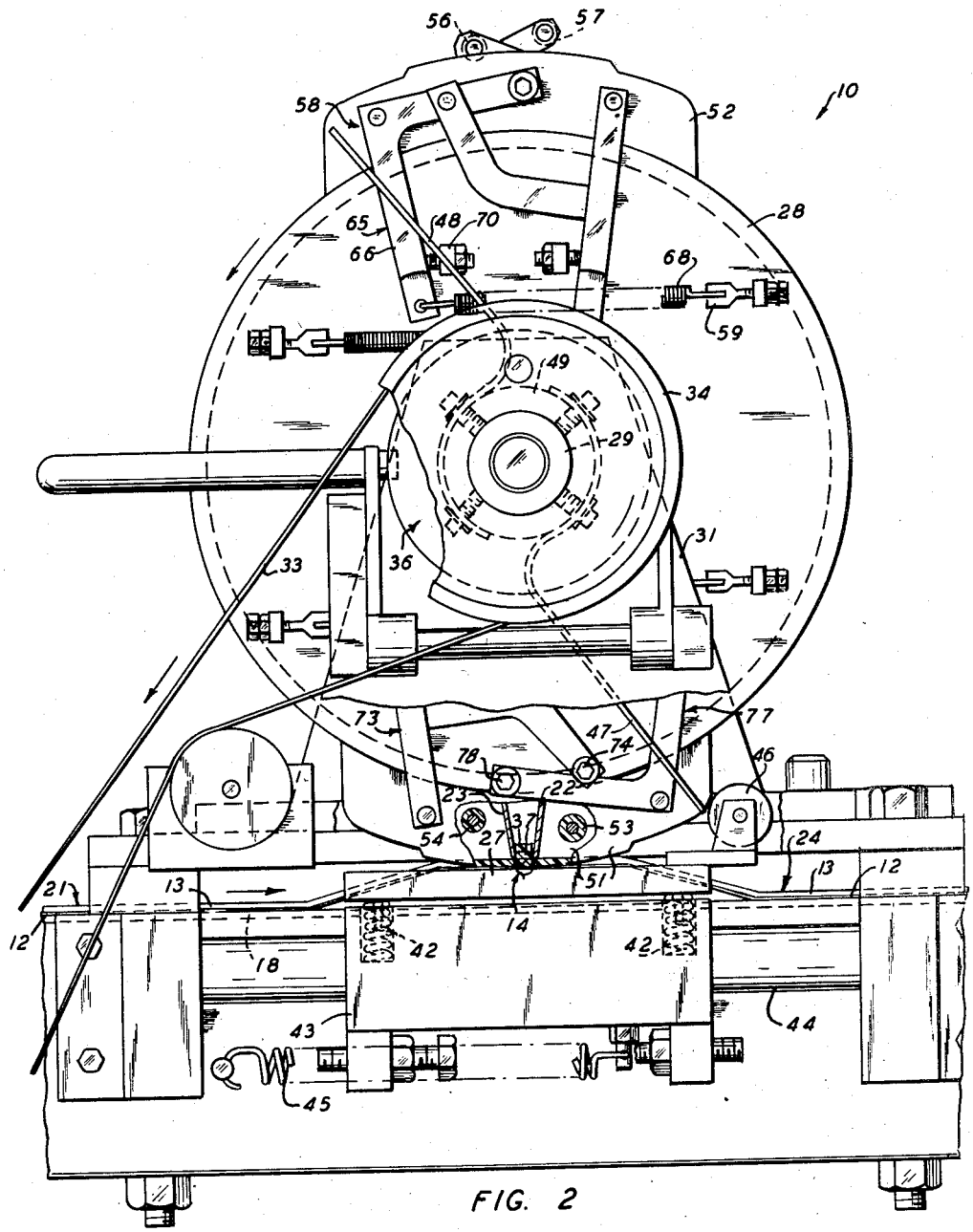
Fig. 2 is a front elevation of the cutting apparatus taken generally along the lines 2—2 of Fig. 1, with parts broken away for clarity.
Figure 3:
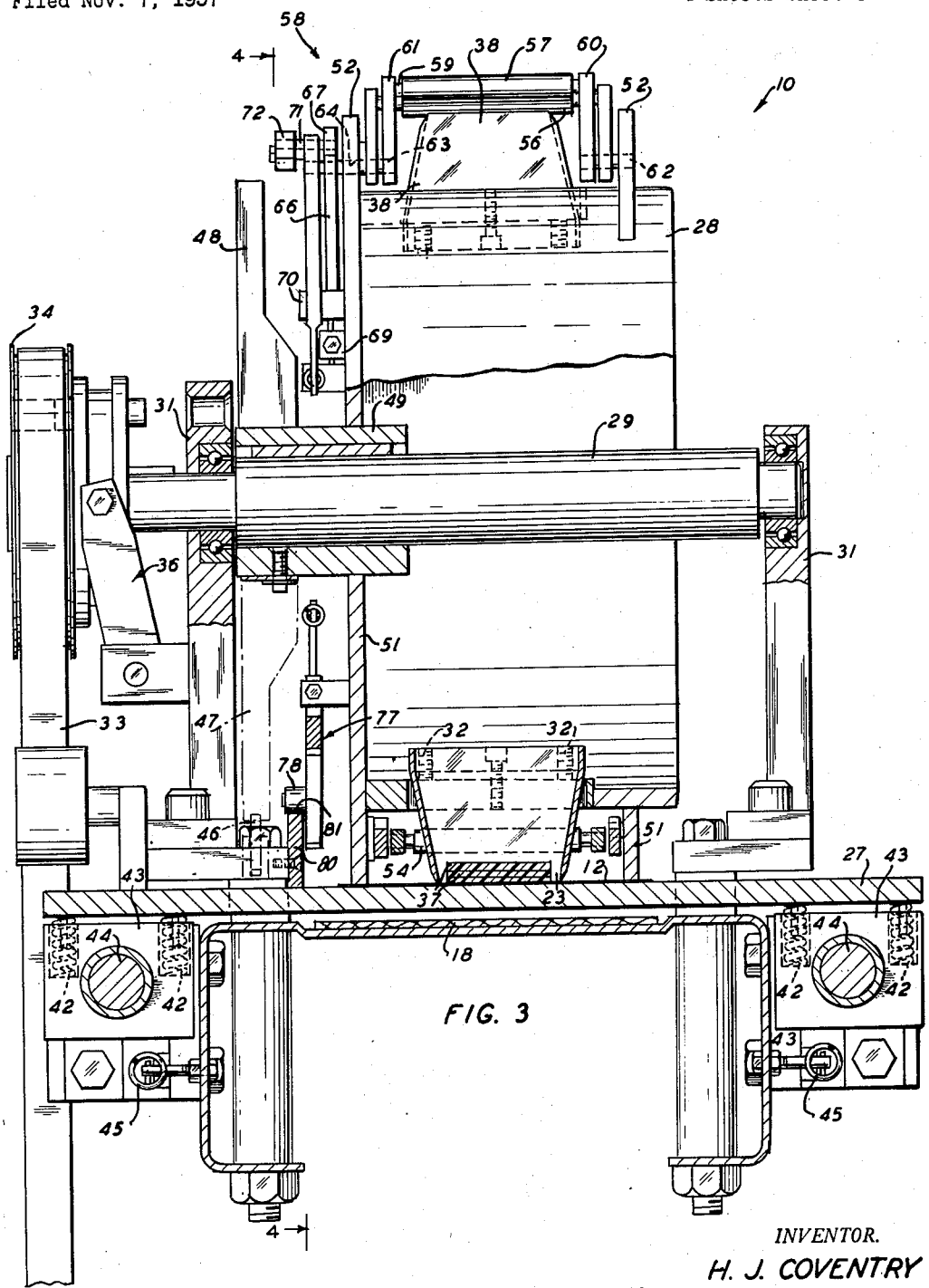
Fig. 3 is a right side elevation of the apparatus shown in Fig. 2, with parts broken away for clarity.
Figure 4:
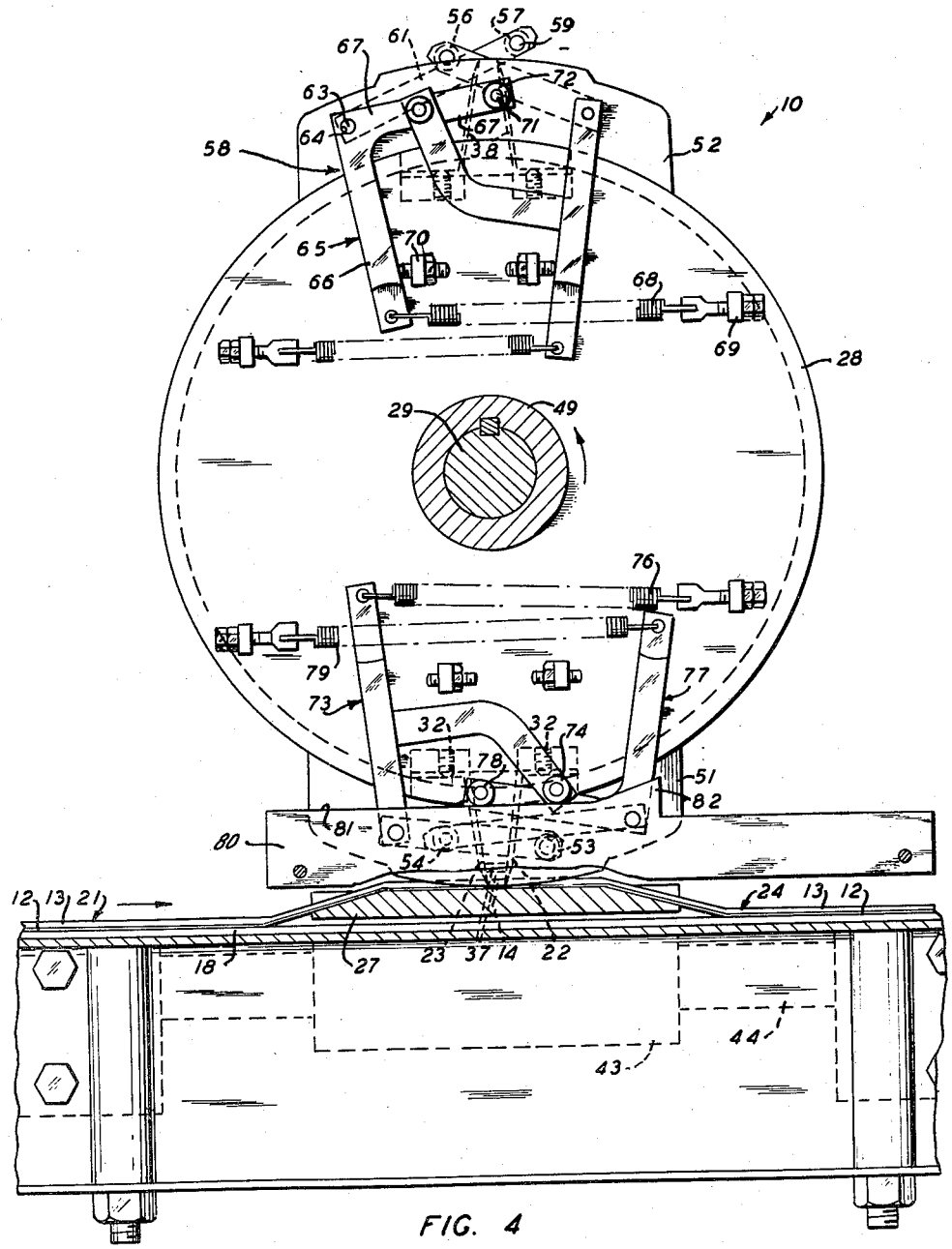
Fig. 4 is a sectional view taken generally along the lines 4—4 of Fig. 3.

Referring now to Figs. 2, 3 and 4, showing the improved cutting apparatus 10 in detail, the composite 21 is shown advancing with the conveyer belt 18 from left to right as viewed in Figs. 2 and 4 through the cutting apparatus 10. A movable backing plate 27 is provided, over which the advancing composite 21 travels, being separated by the backing plate 27 from the conveyer belt 18, which passes therebeneath.

After a predetermined length of the advancing composite 21 has passed over the backing plate 27, a hollow cutter, shown as a pair of spaced cutting blades 22 and 23, is operated to cut out a portion 14 from the tacky strip 13, thus forming the desired cutout composite 24. The cutout composite 24 passes off the backing plate 27 and back into engagement with the conveyer belt 18, as seen at the right in Figs. 2 and 4.

As best seen at the bottom of Fig. 2, the cutting blades 22 and 23 are secured to the periphery of a rotatable drum 28 and project outwardly therefrom. As best seen in Fig. 3, the drum 28 is secured to a rotatable shaft 29, which is journalled for rotation between a pair of support members 31—31. The shaft 29 is mounted transversely with respect to the direction of advancement of the composite 21, and a predetermined distance above the backing plate 27, so that, as the drum 28 rotates with the shaft 29 to carry the blades 22 and 23 to their lowest points, as depicted in Fig. 2, they will cut completely through portions of the tacky strip 13 but will not contact the backing sheet 12.

A plurality of set screws 32—32 may be provided for adjusting precisely the outward projection of the blades 22 and 23 so that, when they are at their lowest points, they will extend substantially completely through portions of the tacky strip 13, but will not contact the backing sheet 12. Thus, the complete cutting out of the portion 14 from the advancing strip 13 is accomplished without the cutting of the backing paper 12.

The drum 28 may be rotated by suitable means, such as a timing belt 33 passing around a driving pulley 34, which may be connected to one end of the shaft 29. A clutch 36 is provided for engaging and disengaging the shaft 29 with and from the driving pulley 34.

The drum 28 is rotated in such direction, counterclockwise as seen in Fig. 2, that the cutting blades 22 and 23 at their lowest points travel in the same direction as the advancing composite 21. The drum 28 is driven in predetermined synchronism with the conveyer belt 18, so that the peripheral speed of the cutting edges of the blades 22 and 23 is substantially the same as the speed of advancement of the composite 21.

It will be seen that, as the lead blade 22 advances to its lowest point, or full cutting position, as seen in Fig. 2, it will first engage a portion of the tacky strip 13. As the lead blade 22 and the advancing composite 21 move to the right at substantially the same speed, the blade 22 will remain in contact with the same portion of the tacky strip 13, and will sever completely therethrough at the lowest point. The trailing blade 23 will follow a similar course, engaging a second portion of the tacky strip 13 to the left a preselected distance, equal to the desired width of the cutout portion 14, from the portion engaged by the lead blade 22.

The spaced cutting blades 22 and 23 will then travel upward from their lowest points, retaining a plug 37 of the tacky material therebetween as they move out of engagement with the tacky strip 13.

When the same blades 22 and 23 are rotated one full revolution, a second portion 14 is cut out from the advancing composite 21, a distance to the rear of the first such portion equal to the circumference of the circle described by the cutting edges of the blades 22 and 23. A second plug 37 of the tacky material will be removed from the tacky strip 13, the second plug 37 adhering to the first plug 37 and pushing it inwardly between the spaced cutting blades 22 and 23.

As successive plugs 37—37 are severed from the advancing strip 13 at predetermined intervals along the length thereof, the plugs 37—37 will be forced inwardly between the spaced cutting blades 22 and 23 and will enter the hollow interior of the drum 28. Since the plugs 37—37 are of tacky material, they will adhere to each other to form a continuous strip as they enter the drum 28. The strip formed by the successive plugs 37—37 may be removed eventually from the drum 28 and fed into the extruder 19 for reuse.

As shown in Fig. 2, it is preferred to provide the blades 22 and 23 with a slight taper toward each other at their cutting edges to facilitate passage of the successive plugs 37—37 between the blades 22 and 23 and into the drum 28.

While the cutter has been shown as consisting of a pair of spaced blades 22 and 23, it is obvious that the cutter could be a one piece, hollow-centered cutter. This latter construction would be especially suitable if a succession of interior shapes were to be cut out, rather than a portion 14 extending the entire width of the strip 13.

A second pair of cutting blades 38—38, best seen at the top of Fig. 4, may be mounted in a similar manner 180° around the periphery of the drum 28 from the blades 22 and 23. This is advantageous because the weight of the second pair of blades 38—38 counterbalances the weight of the first pair 22—23 to facilitate rotation of the drum 28.

The cutting apparatus shown in Fig. 4, with two cutting units spaced 180° apart is designed to provide equally spaced cutout portions 14—14, best seen in Fig. 1. The spacing between successive cutout portions 14—14 is equal to the circumferential distance between the cutting edges of the two sets of blades 22—23 and 38—38, since the circumferential speed of the blades is designed to be substantially equal to the speed of advancement of the composite 21.

Obviously, it would be possible to position more than two pairs of cutting blades around the drum 28, if desired. It is also possible to provide different widths of, or a particular spacing between, successive cutout portions 14 by shaping and arranging properly the sets of cutting blades.

Fig. 5 illustrates a modied series of composite units 39—39 which may be formed, according to the invention, with a particular mounting of four sets of cutting blades around the periphery of the drum 28. The composite units 39—39 are provided with a first series of cutout portions 14—14, extending only through the tacky strip 13, which are produced by the two pairs of blades 22—23 and 38—38, as described in the embodiment shown in Fig. 2.

In addition, it is desired to form a second series of cutout portions 40—40 extending through both the tacky strip 13 and the tacky cord 16. The portions 40—40 are to be cut out half way between the successive cutout portions 14—14. To accomplish this, the two pairs of blades shown in Fig. 4 may be used in conjunction with a second two pairs of blades 41—41 mounted at 90° intervals from the first two pairs. The second pairs of blades 41—41 are long enough to cut out both the strip 13 and the cord 16 at the same time to cut out the portions 40—40.

In this embodiment of the invention, the second cutter 26 is synchronized with the cutting apparatus 10 to sever the paper 12 in the space between cutout portions 40—40 to form the composite units 39—39. With this type of composite unit 39, the paper 12 may be folded over the ends of both the strip 13 and the cord 16 to form a completely sealed final package.

As best seen in Figs. 2 and 3, the movable backing plate 27 is mounted for vertical movement on a plurality of springs 42—42, which are mounted within suitable recesses in a carriage 43. The carriage 43 is mounted for horizontal movement from left to right as seen in Fig. 2 along a pair of guide shafts 44—44. A pair of return springs 45—45 maintain normally the carriage 43 and, thus, the backing plate 27, in the extreme leftward position, as viewed in Fig. 2. A roller 46 secured to the backing plate 27 is disposed in the path of a pair of booster arms 47 and 48. The booster arms 47 and 48 are secured to a hub 49 of the drum 28, which hub 49 is keyed to the drum shaft 29 for rotation therewith.

The lower booster arm 47 is mounted in advance of the lead blade 22 so that it contacts the roller 46 shortly before the lead blade 22 first contacts the tacky strip 13 to begin the cutting operation. The booster arm 47 will then push the roller 46 to the right, as seen in Fig. 2, which causes the backing plate 27 and, thus, the carriage 43 to move to the right against the bias of the return springs 45—45.

The booster arm 47 is designed to contact and push the roller 46 during the entire interval of contact between the blades 22 and 23 and the tacky strip 13. The booster arm 47 is designed to extend approximately as far as the cutting blades 22 and 23 so that the peripheral speed of the pushing portions, and thus the speed of traverse of the backing plate 27, will be substantially the same as the speed of the advancing composite 21 during the cutting operation. Thus, it is seen that the entire cutting unit, consisting of the blades 22 and 23, the advancing composite 21 and the backing plate 27, will move in substantially the same direction at substantially the same speed during the interval required to cut out the portion 14 from the strip 13.

The carriage 43 and, thus, the backing plate 27 will return, under the compulsion of the return springs 45—45, to their original positions as the booster arm 47 passes over the roller 46, after the emergence of the trailing blade 23 from the tacky strip 13, upon completion of the cutting out of the portion 14. The upper booster arm 48 operates in substantially the same manner, to move the backing plate 27 while the upper blades 38—38 are in operation.

A pair of curved, hold-down plates 51—51 may be secured to the periphery of the drum 28 so that they project outwardly therefrom a predetermined distance. One of the hold-down plates 51—51 is disposed on each side of the blades 22 and 23, as seen in Fig. 3, to engage the backing sheet 12 on either side of the tacky strip 13 and clamp the backing sheet 12 to the backing plate 27 during the cutting operation. The hold-down plates 51—51 are so designed that, at their lowermost point of descent, they will come into slight contact with the movable backing plate 27 to depress it downwardly a slight distance against the upward biasing forces exerted by the mounting springs 42—42.

To assure that the blades 22 and 23 cannot cut the paper 12, the set screws 32—32 are adjusted so that the blades 22 and 23 extend outwardly from the drum 28 such a distance that the cutting edges are exactly flush with the adjacent curved edges of the hold-down plates 51—51. Thus, even if the backing plate 27 should expand due to the heat of the tacky strip 13, or for any other reason, the hold-down plates 51—51 will move the backing plate 27 downward, to position properly the advancing composite 21 so that only the strip 13 can be severed. A second pair of curved hold-down plates 52—52 are mounted similarly on the drum 28 adjacent to the upper blades 38—38.

A pair of retractable stripping sleeves 53 and 54, shown in their retracted positions in Fig. 2, are mounted pivotally between the lower hold-down plates 51—51. The stripping sleeves 53 and 54 are designed, after completion of the cutting operation, to be extended to engage the remaining portions of the tacky strip 13 adjacent to the cutting blades 22 and 23, respectively, to strip such remaining portions away from the rising cutting blades 22 and 23, and to push such remaining portions back into adhering contact with the backing sheet 12.

The stripping sleeves 53 and 54 are made of suitable material such as Teflon, which has a low adherence to the tacky material as compared to the adhesion between the tacky material and the wax paper backing sheet 12. A second set of stripping sleeves 56 and 57 are mounted similarly between the upper hold-down plates 52—52 and function in a similar manner with respect to the cutting blades 38—38.

The stripping sleeves occupy normally the position shown at the top of Fig. 2, wherein the upper stripping sleeves 56 and 57 extend outwardly beyond the cutting edges of their associated blades 38—38. Prior to the cutting operation, the stripping sleeves are retracted to the position shown with respect to the lower sleeves 53 and 54, associated with the blades 22 and 23, respectively.

As the blade 22 withdraws from the tacky strip 13 upon completion of the cut, the associated sleeve 53 is extended to push the remaining portion of the tacky strip 13 to the right of the lead blade 22 back into position on the backing sheet 12. Shortly thereafter, when the trailing blade 23 is withdrawn, the associated sleeve 54 will be extended in a similar manner to push the remaining portion of the tacky strip 13 to the left of the trailing blade 23 back into position on the backing sheet 12.

Suitable means are provided for retracting and extending the stripping sleeves 53, 54, 56 and 57 at the proper times. A suitable linkage, designated generally by the numeral 58, for mounting the stripping sleeve 57 is shown at the top of Figs. 3 and 4, and will be described in detail, it being understood that each of the other sleeves 53, 54 and 56 is mounted similarly.

As best seen at the top of Fig. 3, the stripping sleeve 57 is mounted for rotation on a spindle 59, which spindle 59 is secured between the upper ends of a pair of links 60 and 61. The lower end of the link 60 is keyed to one end of a pin 62, the other end of the pin 62 being mounted for rotation within a bore in the right-hand, hold-down plate 52.

The lower end of the link 61 is keyed to one end of a pivot pin 63. The pivot pin 63 extends through an aperture 64 in the left-hand, hold-down plate 52, and is free to rotate within the aperture 64. As best seen in Fig. 4, the other end of the pivot pin 63 is keyed to a lever, indicated generally by the numeral 65, having two arms 66 and 67. The first arm 66 extends along the face of the drum 28, from the point of connection with the pivot pin 63 downward toward the center of the drum 28.

The lower end of the arm 66 is secured to one end of a return spring 68, the other end of which is connected to an anchor 69, which anchor 69 is secured to the front face of the drum 28. The arm 66 is normally pivoted by the return spring 68 in a counterclockwise direction with respect to the pivot pin 63 so that the stripping sleeve 57 is fully extended. A stop 70, also mounted to the front face of the drum, limits the movement of the arm 66 and determines the normal extension of the stripping sleeve 57.

The second arm 67 of the lever 65 extends outwardly beyond the periphery of the drum 28, and has a pin 71 secured to its outer end upon which is mounted rotatably a cam roller 72. It can be seen in Fig. 4 that, when the cam roller 72 is pushed inwardly by suitable means to be described hereinafter, the lever 65 and the pivot pin 63 will be rotated in a clockwise direction, the pin 63 serving as a pivot for the lever 65 at the point whereat it passes through the aperture 64 in the plate 52, the arm 66 moving in a clockwise direction away from the stop 71 against the action of the return spring 68. Since the link 61 carrying the spindle 59 for the stripping sleeve 57 is keyed to the other end of the pivot pin 63, the sleeve 57 will be rotated with the rotation of the pin 63 and will be retracted inwardly toward the center of the drum 28 so that it will no longer extend beyond the cutting edges of the blades 38—38.

In a similar manner, the stripping sleeve 53, associated with the lower lead blade 22 may be retracted by similar linkage, indicated generally by the numeral 73, when a cam roller 74 associated therewith is pushed inwardly against the action of an associated return spring 76. Similarly, the stripping sleeve 54, associated with the lower trailing blade 23 may be retracted by linkage, indicated generally by the numeral 77, when a cam roller 78 associated therewith is pushed inwardly against the action of an associated return spring 79.

A camming member 80, illustrated in Figs. 3 and 4, having a contoured camming surface 81 is mounted to the front support 31, and is disposed in the path of the cam rollers 74 and 78 as the cutting blades 22 and 23, respectively, approach the cutting position. As best seen at the bottom of Fig. 4, the cam rollers 74 and 78, associated with the cutting blades 22 and 23, respectively, ride upon the camming surface 81 during the cutting operation to retract the stripping sleeves 53 and 54, respectively, out of the path of the advancing composite 21.

At the moment of complete withdrawal of the blades 22 and 23 from cutting engagement with the tacky strip 13, the cam rollers 74 and 78 will, in succession, ride off a raised end 82 of the camming surface 81. When this occurs, the return springs 76 and 79, respectively, will pivot the linkages 73 and 77 to extend the stripping sleeves 53 and 54 to strip the remaining portions of the tacky strip 13 away from the cutting blades 22 and 23, and to push such remaining portions back into adhesive contact with the backing paper 12.

*Operation*

In the operation of the specific embodiments of the invention shown and described, the extruder 19 and the supply roll 17 are operated to feed the tacky strip 13 and the backing sheet 12 onto the upper surface of the moving conveyer belt 18, as best seen in Fig. 1. The tacky strip 13 adheres to the upper surface of the backing sheet 12 to form the advancing composite 21. The composite 21 advances through the improved cutting apparatus, designated generally by the numeral 10, the advancing composite 21 passing over the movable backing plate 27 and the conveyer belt 18 passing therebeneath. The extruder 19 may also supply the tacky cord 16 in spaced relationship to the strip 13, as seen in Fig. 1, the cord 16 bypassing the cutting apparatus 10.

Referring now to Figs. 2 and 3, the clutch 36 is engaged to rotate the drum 28 in predetermined synchronism with the conveyer belt 18, at such speed that the peripheral speed of the cutting edges of the blades 22 and 23 is substantially the same as the speed of advancement of the composite 21. As the cutting blades 22 and 23 advance to their lowest points, as seen in Fig. 2, they will engage spaced portions of the tacky strip 13, and then, as the blades 22 and 23 and the advancing composite 21 move to the right at substantially the same speed, the blades 22 and 23 will remain in engagement with the same portions of the tacky strip 13 and will cut completely therethrough at their lowest points of descent. The cutting blades 22 and 23 will then travel upward from their lowest points, retaining the cutout plug 37 of tacky material therebetween as they move out of engagement with the tacky strip 13, thus completing the cutting operation.

Immediately prior to the cutting operation, the booster arm 47 contacts the roller 46 causing movement of the backing plate 27 to the right, as seen in Fig. 2, against the tension of the carriage return springs 45—45, at substantially the same speed as the speed of advancement of the composite 21. Upon completion of the cutting operation, the booster arm 47 will ride over the roller 46, and the backing plate 27 will be returned to its original position by the carriage return springs 45—45.

During the cutting operation, the curved hold-down plates 51—51 engage the backing paper 12 on either side of the tacky strip 13 and clamp the paper 12 to the backing plate 27, as best illustrated in Fig. 3. Further, the hold-down plates 51—51 depress the movable backing plate 27 against the upward biasing forces exerted by the mounting springs 42—42 to assure that the advancing composite 21 is in the proper position for cutting. Since the cutting edges of the blades 22 and 23 extend outwardly exactly as far as the adjacent curved edges of the hold-down plates 51—51, as adjusted precisely by the set screws 32—32, the blades 22 and 23 at their lowermost points will cut out completely the portion 14 from the tacky strip 13, but cannot contact the backing paper 12.

Prior to the cutting operation, the pivotally mounted stripping sleeves 53 and 54 are retracted against the tensions exerted by their associated return springs 76 and 79 as the cam rollers 74 and 78 engage and ride upon the camming surface 81. As the cutting blades 22 and 23 withdraw from cutting engagement with the tacky strip 13, the cam rollers 74 and 78 ride off the raised end portion 82 of the camming surface 81 so that the linkages 73 and 77 are pivoted by the springs 76 and 79 to extend the stripping sleeves 53 and 54. The remaining portions of the tacky strip 13 are thereby stripped away from the cutting blades 22 and 23, and are pushed back into adhesive contact with the backing paper 12.

Then, the booster arm 47 rides over the roller 46 so that the carriage 43 and the backing plate 27 carried thereby are moved from right to left, as viewed in Fig. 2, back to their original positions in preparation for the next cutting operation. A single cutting operation has now been completed and the drum 28 continues rotating while the composite 21 passes therebeneath.

When the drum 18 has so rotated through approximately 180°, with the cutter illustrated in Figs. 2 to 4, the upper cutting blades 38—38 will then be rotated into cutting engagement with the advancing composite 21, and will operate to cut out a second portion 14 from the tacky strip 13, a distance behind the first such portion equal to the circumferential distance between the cutting edges of the two sets of blades 22—23 and 38—38. The second cutting operation proceeds substantially as described with respect to the first such operation.

When the drum 28 has rotated through another 180°, the blades 22 and 23 are rotated again into engagement with the advancing composite 21 and another plug 37 of tacky material will be cut out from the tacky strip 13, which plug 37 will adhere to the other such plugs and will push them radially inwardly between the blades 22 and 23. Successive plugs 37—37 will be forced between the blades 22 and 23 and will form a strip, which will enter the hollow interior of the drum 28. The strip formed by the successive plugs 37—37 may be removed eventually from the drum 28 and fed into the extruder 19 for reuse.

The cutout composite 24 passes off of the backing plate 27 and back into engagement with the conveyer belt 18. As seen in Fig. 1, the cutout composite 24 may be cut to length with a second cutter 26, operated in predetermined synchronism with the cutting apparatus 10, and then folded and packaged in a suitable manner for eventual use in cable splicing.

In the copending patent application in the name of E. D. Hanson, Serial No. 695,098, filed November 7, 1957, there is disclosed a related apparatus for cutting tacky material, having a pair of extensible cutting blades mounted on a rotatable drum to accomplish the cutting, and an extensible ejector mechanism positioned between the cutting blades for ejecting the plugs of tacky material retained between the cutting blades.

It will be manifest that this invention is not limited to the specific details described in connection with the above embodiments of the invention but that various modifications may be made without departing from the spirit and scope thereof.

What is claimed is:

1. Apparatus for cutting out a portion from an advancing strip of tacky material, which comprises a rotatable drum, a hollow cutter secured to the periphery of said drum and projecting outwardly therefrom, means for rotating said drum so that said cutter moves into and out of cutting engagement with the tacky strip, the cutout portion being retained within said hollow cutter upon movement thereof out of engagement with the tacky strip, a pair of stripping sleeves secured pivotally to said drum and positioned one on either side of said cutter, a pair of two-armed levers carried by said drum and designed for pivoting said stripping sleeves, a pair of return springs secured between the first arms of said levers and said drum for urging normally said levers in such direction that the stripping sleeves are pivoted to extend further outwardly from said drum than the projection of said cutter, a pair of cam rollers carried by the second arms of said levers, and a stationary camming member having a camming surface designed for engaging said cam rollers as said cutter moves into cutting engagement with the tacky strip to pivot said stripping sleeves inwardly out of the path of the advancing tacky strip, said cam rollers riding off of said camming surface as said cutter moves out of cutting engagement with the tacky strip, said return springs pivoting said levers so that said stripping sleeves are extended to strip the remaining portions of the tacky strip adjacent to said cutter away from said cutter.

2. Apparatus for cutting out a portion of tacky material from an advancing composite composed of a strip of tacky material adhering to the upper surface of a backing sheet of nontacky material, which comprises a rotatable drum, a hollow cutter secured to the periphery of said drum and projecting outwardly therefrom, said drum being mounted a predetermined distance above the advancing composite so that said cutter at its lowest point extends substantially completely through portions of the tacky strip to be cut but not into contact with the backing sheet, means for rotating said drum in such direction that said cutter at its lowest point travels in the same direction as the advancing composite and at such speed that the peripheral speed of the cutting edges of said cutter is substantially the same as the speed of advancement of the composite, whereby a portion of the tacky strip is cut out by said cutter as it moves into and out of engagement therewith, which cutout portion is retained within said hollow cutter, the remaining portions of the tacky strip adjacent to said cutting blades tending to stick to the outsides of said cutter so as to be withdrawn from the backing sheet as said cutter moves out of cutting engagement with the tacky strip, and means for stripping the remaining portions of the tacky strip adjacent to said cutter away therefrom and for pushing such remaining portions back into position on the backing sheet substantially simultaneously with the movement of said cutter out of engagement with the tacky strip.

3. Apparatus for cutting out a succession of portions of tacky material at predetermined intervals along the length of an advancing composite composed of a strip of tacky material adhering to the upper surface of a backing sheet of nontacky material, which comprises a rotatable drum, a pair of spaced cutting blades secured to the periphery of said drum and projecting outwardly therefrom, said drum being mounted a predetermined distance above the advancing composite so that, upon each revolution of said drum, said cutting blades at their lowest points extend substantially completely through portions of the tacky strip to be cut but not into contact with the backing sheet, means for rotating said drum in such direction that said cutting blades at their lowest points travel in the same direction as the advancing composite and at such speed that the peripheral speed of the cutting edges of said cutting blades is substantially the same as the speed of advancement of the composite, said cutting blades being so designed that each successive cutout portion is retained between said spaced cutting blades and will adhere to and push the next preceding cutout portion inwardly between said spaced cutting blades to form a continuous strip of cutout portions, the remaining portions of the tacky strip adjacent to said cutting blades tending to stick to the outsides of said blades so as to be withdrawn from the backing sheet as said blades move out of cutting engagement with the tacky strip, and means for stripping the remaining portions of the tacky strip away from said cutting blades and for pushing such portions back into position on the backing sheet upon movement of said cutting blades out of engagement with the tacky strip.

4. Apparatus for cutting out a portion of tacky material from an advancing composite composed of a strip of tacky material adhering to the upper surface of a backing sheet of nontacky material, which comprises a rotatable drum, a pair of spaced cutting blades secured to the periphery of said drum and projecting outwardly therefrom, said drum being mounted a predetermined distance above the advancing composite so that said cutting blades at their lowest points extend substantially completely through portions of the tacky strip to be cut but not into contact with the backing sheet, means for rotating said drum in such direction that said cutting blades at their lowest points travel in the same direction as the advancing composite and at such speed that the peripheral speed of the cutting edges of said cutting blades is substantially the same as the speed of advancement of the composite, whereby a portion of the tacky strip is cut out by said cutting blades as they move into and out of engagement therewith, which cutout portion is retained between said spaced cutting blades, the remaining portions of the tacky strip adjacent to said cutting blades tending to stick to the outsides of said blades so as to be withdrawn from the backing sheet as said blades move out of cutting engagement with the tacky strip, a pair of stripping sleeves secured retractably to said drum and positioned one on either side of said cutting blades, means for retracting said stripping sleeves out of the path of the advancing composite prior to the engagement of said cutting blades therewith, and means for extending said stripping sleeves into engagement with the remaining portions of the tacky strip adjacent to said cutting blades substantially simultaneously with the movement of said cutting blades out of engagement with the tacky strip so constructed and arranged that the remaining portions of the tacky strip on either side of said cutting blades are stripped away therefrom and are pushed back into position on the backing sheet.

5. Apparatus for cutting out a portion of tacky material from an advancing composite composed of a strip of tacky material adhering to the upper surface of a backing sheet of nontacky material, which comprises a movable backing plate over which the composite advances, a rotatable drum, a pair of spaced cutting blades secured to the periphery of said drum and projecting outwardly therefrom, said drum being mounted a predetermined distance above the advancing composite so that said cutting blades at their lowest points extend substantially completely through portions of the tacky strip to be cut but not into contact with the backing sheet, means for rotating said drum in such direction that said cutting blades at their lowest points travel in the same direction as the advancing composite and at such speed that the peripheral speed of the cutting edges of said cutting blades is substantially the same as the speed of advancement of the composite, whereby a portion of the tacky strip is cut out by said cutting blades as they move into and out of engagement therewith, which cutout portion is retained between said spaced cutting blades, the remaining portions of the tacky strip adjacent to said cutting blades tending to stick to the outsides of said blades so as to be withdrawn from the backing sheet as said blades move out of cutting engagement with the tacky strip, means for moving said movable backing plate in the same direction as the direction of advancement of the composite and at substantially the same speed as the speed of advancement of the composite during the interval of cutting engagement between said cutting blades and the tacky strip, a pair of stripping sleeves secured retractably to said drum and positioned one on either side of said cutting blades, means for retracting said stripping sleeves out of the path of the advancing composite prior to the engagement of said cutting blades therewith, and means for extending said stripping sleeves into engagement with the remaining portions of the tacky strip adjacent to said cutting blades substantially simultaneously with the movement of said cutting blades out of engagement with the tacky strip so constructed and arranged that the remaining portions of the tacky strip on either side of said cutting blades are stripped away therefrom and are pushed back into position on the backing sheet.

6. Apparatus for cutting out a portion of tacky material from an advancing composite composed of a strip of tacky material adhering to the upper surface of a backing sheet of nontacky material and arranged on the backing sheet so that portions of the backing sheet extend on each side of the tacky strip, which comprises a movable backing plate over which the composite advances, a rotatable drum, a pair of cutting blades secured to the periphery of said drum and projecting outwardly therefrom, said drum being mounted a predetermined distance above the advancing composite so that said cutting blades at their lowest points extend substantially completely through portions of the tacky strip to be cut but not into contact with the backing sheet, means for rotating said drum in such direction that said cutting blades at their lowest points travel in the same direction as the advancing composite and at such speed that the peripheral speed of the cutting edges of said cutting blades is substantially the same as the speed of advancement of the composite, whereby a portion of the tacky strip is cut out by said cutting blades as they move into and out of engagement therewith, which cutout portion is retained between said cutting blades, the remaining portions of the tacky strip adjacent to said cutting blades tending to stick to the outsides of said blades so as to be withdrawn from the backing sheet as said blades move out of cutting engagement with the tacky strip, a pair of curved hold-down plates secured to the periphery of said drum and projecting outwardly therefrom a distance substantially equal to the outward projection of said cutting blades, said hold-down plates being designed to engage and hold down the backing sheet on each side of the tacky strip during the interval of cutting and to push down said movable backing plate to position the advancing composite with respect to said cutting blades, a pair of stripping sleeves secured retractably to said drum and positioned one on either side of said cutting blades, means for retracting said stripping sleeves out of the path of the advancing composite prior to the engagement of said cutting blades therewith, and means for extending said stripping sleeves into engagement with the remaining portions of the tacky strip adjacent to said cutting blades substantially simultaneously with the movement of said cutting blades out of engagement with the tacky strip so constructed and arranged that the remaining portions of the tacky strip on either side of said cutting blades are stripped away therefrom and are pushed back into position on the backing sheet.

7. Apparatus for cutting out a portion of tacky material from an advancing composite composed of a strip of tacky material adhering to the upper surface of a backing sheet of nontacky material and arranged on the backing sheet so that portions of the backing sheet extend on each side of the tacky strip, which comprises a movable backing plate over which the composite advances, a rotatable drum, a pair of cutting blades secured to the periphery of said drum and projecting outwardly therefrom, said drum being mounted a predetermined distance above the advancing composite so that said cutting blades at their lowest points extend substantially completely through portions of the tacky strip to be cut but not into contact with the backing sheet, means for rotating said drum in such direction that said cutting blades at their lowest points travel in the same direction as the advancing composite and at such speed that the peripheral speed of the cutting edges of said cutting blades is substantially the same as the speed of advancement of the composite, whereby a portion of the tacky strip is cut out by said cutting blades as they move into and out of engagement therewith, which cutout portion is retained between said cutting blades, the remaining portions of the tacky strip adjacent to said cutting blades tending to stick to the outsides of said blades so as to be withdrawn from the backing sheet as said blades move out of cutting engagement with the tacky strip, means for moving said movable backing plate in the same direction as the direction of advancement of the composite and at substantially the same speed as the speed of advancement of the composite during the interval of cutting engagement between said cutting blades and the tacky strip, a pair of curved hold-down plates secured to the periphery of said drum and projecting outwardly therefrom a distance substantially equal to the outward projection of said cutting blades, said hold-down plates being designed to engage and hold down the backing sheet on each side of the tacky strip during the interval of cutting and to push down said movable backing plate to position the advancing composite with respect to said cutting blades, a pair of stripping sleeves secured pivotally to said drum and positioned one on either side of said cutting blades, means for retracting said stripping sleeves out of the path of the advancing composite prior to the engagement of said cutting blades therewith, and means for extending said stripping sleeves into engagement with the remaining portions of the tacky strip adjacent to said cutting blades substantially simultaneously with the movement of said cutting blades out of engagement with the tacky strip so constructed and arranged that the remaining portions of the tacky strip on either side of said cutting blades are stripped away therefrom and are pushed back into position on the backing sheet.

8. Apparatus for cutting out a portion of tacky material from an advancing composite composed of a strip of tacky material adhering to the upper surface of a backing sheet of nontacky material and arranged on the backing sheet so that portions of the backing sheet extend on each side of the tacky strip, which apparatus comprises a movable backing plate over which the composite advances so that the under surface of the backing sheet engages the upper surface of said backing plate, resilient means for biasing said backing plate upward to a first position, a hollow cutter, means for moving said cutter into and out of engagement with the advancing composite, and means operable as said cutter moves into engagement with the advancing composite for engaging the backing sheet on each side of the tacky strip to clamp the backing sheet against said backing plate and for depressing said movable backing plate downward against the action of said biasing means, said engaging-and-depressing means being so constructed and arranged with respect to the maximum extension of said cutter that said backing plate is depressed from the first position to a second position such that said cutter cuts out completely a portion from the tacky strip but does not contact the backing sheet.

9. Apparatus for cutting out a portion of tacky material from an advancing composite composed of a strip of tacky material adhering to the upper surface of a backing sheet of nontacky material and arranged on the backing sheet so that portions of the backing sheet extend on each side of the tacky strip, which apparatus comprises a movable backing plate over which the composite advances so that the under surface of the backing sheet engages the upper surface of said backing plate, resilient means for biasing said backing plate upward to a first position, a hollow cutter, means for moving said cutter into and out of engagement with the advancing composite such that during the cutting operation said cutter moves in the direction of advancment of the composite and at substantially the same speed, means for moving said backing plate in the direction of advancement of the composite and at substantially the same speed as the speed of advancement of the composite during the cutting operation, means operable as said cutter moves into engagement with the advancing composite for clamping the backing sheet against said backing plate and for depressing said movable backing plate downward against the action of said biasing means, said clamping-and-depressing means being so constructed and arranged with respect to the maximum extension of said cutter that said backing plate is depressed from the first position to a second position such that said cutter cuts out completely a portion from the tacky strip but does not contact the backing sheet.

References Cited in the file of this patent

UNITED STATES PATENTS

| | | |
|---|---|---|
| 2,294,020 | Breth et al. | Aug. 25, 1942 |
| 2,547,118 | Hart | Apr. 3, 1951 |
| 2,612,853 | Bale | Oct. 7, 1952 |